April 21, 1959     D. A. CERCONE     2,882,732
MEASURING SPOON
Filed Aug. 3, 1956
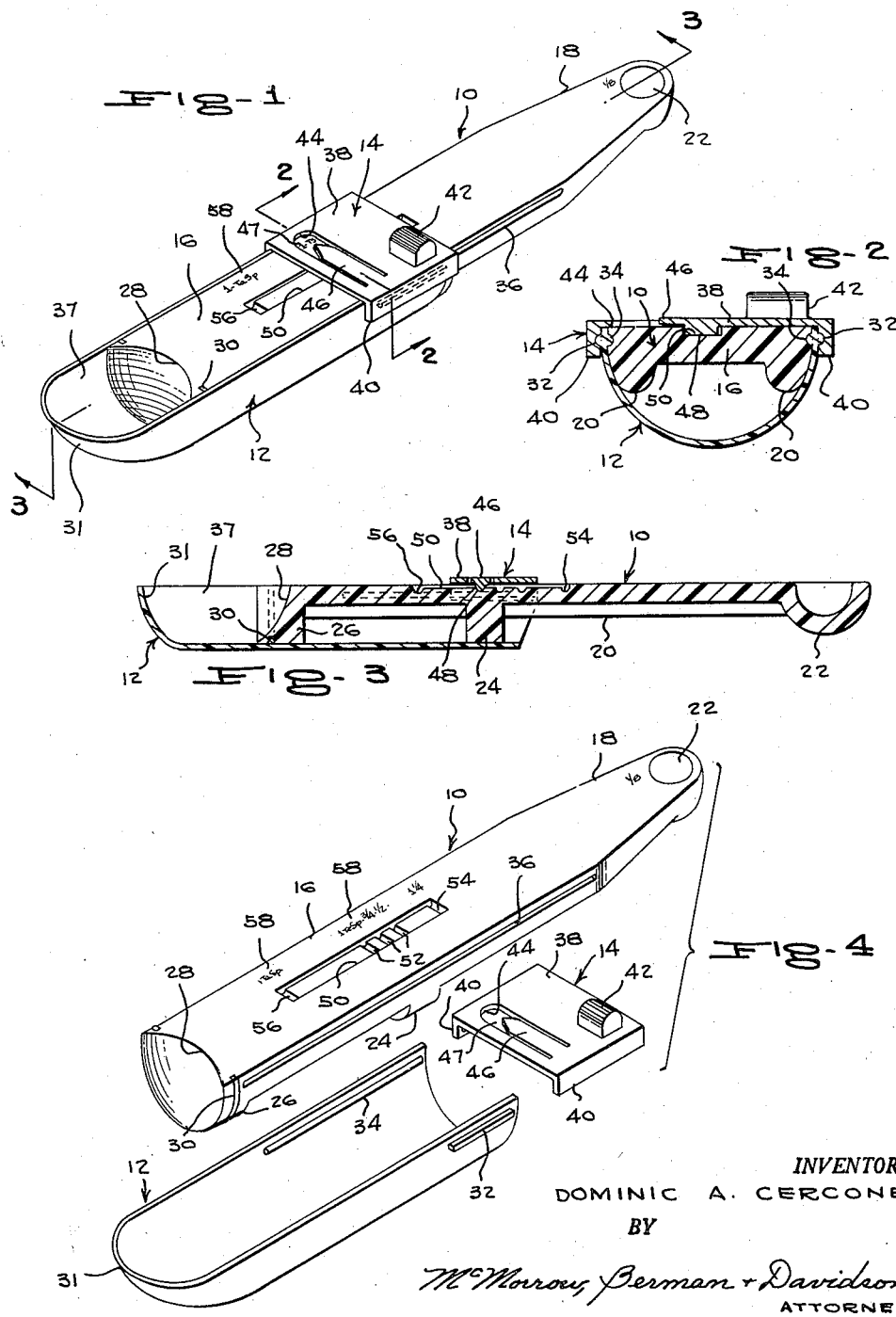
INVENTOR.
DOMINIC A. CERCONE
BY
McMorrow, Berman & Davidson
ATTORNEYS

United States Patent Office 2,882,732
Patented Apr. 21, 1959

2,882,732

MEASURING SPOON

Dominic A. Cercone, Bradford, Pa.

Application August 3, 1956, Serial No. 601,903

5 Claims. (Cl. 73—429)

This invention relates to measuring spoons, and more particularly has reference to a measuring spoon so designed that adjustments can be readily made therein to permit use of the same for measuring various quantities of liquid or granular materials.

One object of importance is to permit measuring to be carried out far more conveniently in the home or in various business establishments such as restaurants or bakeries, as well as in laboratories, wherein measurements of material must be made with considerable frequency.

Another object is to provide a device of the character described which will be so designed as to eliminate the necessity presently existing, of selecting a spoon from one of a set thereof, for making a particular measurement of material.

Still another object is to permit the adjustment of the device for a particular measurement to be carried out with maximum ease, by a very slight movement of the thumb, either outwardly or inwardly, of a hand grasping the spoon. In this way, it is proposed to provide a measuring spoon that will require its being held with only one hand, so that there is freedom of the other hand.

Still another object is to provide a measuring spoon with a minimum number of components, readily assembled with or disassembled from one another, thus to facilitate manufacture as well as cleaning.

Another object of importance is to provide a measuring spoon of the character described which will be of highly compact construction, will be rugged, durable, and will be of a size no greater than that of many conventional spoons presently in use, not having the desirable characteristics of the present invention.

Other objects will appear from the following description, the claims appended thereto, and from the annexed drawing, in which like reference characters designate like parts throughout the several views, and wherein:

Figure 1 is a perspective view of the measuring device formed according to the present invention;

Figure 2 is an enlarged transverse sectional view on line 2—2 of Figure 1;

Figure 3 is a longitudinal section on line 3—3 of Figure 1; and

Figure 4 is an exploded perspective view of the spoon.

Referring to the drawings in detail, the reference numeral 10 designates the body portion of the spoon, while at 12 there has been designated a trough portion, the reference numeral 14 being similarly used to designate an adjustable slide to be used in a manner presently to be made apparent herein.

Each of these three components of the device will be described in turn, and considering first the body portion 10, this includes an elongated main part 16 merging at one end into a tapering handle 18. Main part 16 and handle 18 have flat, coplanar top surfaces, and as shown in Figure 2, the underside of the body portion is formed with longitudinally extending ribs 20 at opposite sides of the body portion, providing means to strengthen the body portion.

At the outer end of the tapered handle 18, there is formed a downwardly concavo-convex depression 22, in the form of a hemispherical part of the handle. This is so proportioned that the upwardly opening depression will be adapted to measure an eighth of a teaspoon of material, when dipped thereinto.

Integral with the body portion, intermediate opposite ends thereof, is a transverse rib 24, defining a partition on the underside of the body portion spaced longitudinally of the body portion from an end wall 26 thereof. End wall 26 and the transverse rib 24 are both of approximately semicircular appearance when the spoon is viewed in cross section as in Figure 2, and it will be understood that the rib 24 would constitute a bracing means, adapted to cooperate with the end rib 26 in properly mounting slidably upon the body portion the trough member 12.

In the end surface of the body portion remote from the handle 18, there is formed a shallow concavity or depression 28, constituting a fragment of a spherical cavity as shown in Figures 1 and 3. In the outer surface of the end rib 26 there is formed a groove receiving a sealing strip 30, which bears against the inner surface of the extensible trough member 12. It will be understood that the sealing means defined by the strip 30 can be eliminated, together with the strip-receiving groove of the end rib, in certain commercial embodiments, and it is not desired that the protection for the invention be limited solely to a spoon having such a leak-preventive means. The leak-preventive strip or gasket can be eliminated, for example, when the relatively slidable parts of the device are formed of a material having the particular, intrinsic characteristic of bearing closely against one another and expanding slightly, for the purpose of preventing leakage therebetween.

The trough member 12, as shown in Figure 4, has one end open, the other end being closed by a rounded end wall 31, which is bowed oppositely to the depression 28 as best shown in Figure 3 to permit the maximum amount of material to be held in the receptacle or recess defined between the end rib 26 and the end wall 31.

In any event, on the outer surface of the trough member 12, adjacent the open end thereof, there are formed relatively short longitudinal ribs 32. On the inner surface of said trough member there are formed longer ribs 34, and both the ribs 32 and 34 are adapted to provide guide means as shown in Figure 2.

Formed in the opposite sides of the elongated, main part 16 of the body portion 10 are longitudinal guide grooves 36. These are adapted to receive the tongues 34 of the trough member. As a result, the trough member is slidably mounted upon the body portion, with the trough member being slidable a selected distance beyond the end rib 26. There is thus defined between the end rib 26 and the end wall 31 of the trough member an upwardly opening recess 37 in which the material being measured will be confined. The recess is adjusted in area by selected relative longitudinal movement of the body portion and trough member.

The slide generally designated 14 is formed from a flat, rectangular, relatively thin piece of material, shaped to include a plate 38 bridging the trough member and the body portion as shown in Figures 1 and 2 and formed at its opposite sides with depending lips 40, having in their inner surfaces longitudinally extending grooves receiving the outwardly projecting guide ribs 32 of the trough member. Thus, the plate 38 may be flexed slightly for the purpose of spreading the depending lips or flanges sufficiently to permit the same to be engaged over the ribs 32. Since the grooves of the lips 40 are closed at their opposite ends, the slide is thus fixedly connected to the trough member, to slide therewith upon the body portion 10.

In one corner of the slide, there is formed a handle lug 42 having a knurled or otherwise roughened top surface, so that one grasping the handle 18 in one hand can exert pressure with his thumb upon the lug 42, to shift the slide 14 toward either the outer or the inner end of the device, whichever is necessary, depending upon whether the measurement is to be decreased or increased.

Forwardly of the lug 42, and extending transversely of the plate 38, there is a relatively wide slot 44, and integral with the material of the plate and disposed in the plane of said plate within the slot is a pointer or index arm 46 terminating inwardly from the adjacent slot end, thus to define a viewing window 47 through which can be observed indicia marked upon the top surface of the body portion.

On the underside of the index arm or pointer 46, there is formed a depending, relatively low-crowned detent projection 48. The projection 48 is adapted to move within a longitudinally extending, shallow recess 50 formed in the top surface of the main part 16 of body portion 10. In the bottom of the recess, there are formed transversely extending, closely spaced grooves 52 any of which is adapted to receive the detent projection 48. The grooves 52 will be disposed inwardly from one end of the recess 50, and in said one end of the recess there is provided a transverse groove 54 while at the other end there is a transverse groove 56. By reason of this arrangement, indicia 58 can be marked upon the top surface of the main part 16, to be selectively viewed through the sight window 47 and registered with the point of the index arm 46. Thus, the three grooves 52 can be respectively marked to designate one-half teaspoon, three-fourths of a teaspoon, and one full teaspoon. The recess or groove 56 may be associated with an indicium designating one tablespoon, while the indicium 54 may be registered with an indicium for one-fourth teaspoon.

Of course, the principles of the invention are what protection is being sought for, not the particular indicia used, and it is believed that according to the particular uses to which the invention is to be put, any of various types of indicia may be associated with the grooves. Still further, the spacing and the number of the grooves can be varied within the scope of the claims as appended hereto.

In any event, in use of the device, the trough member is assembled with the body portion, sliding upon the body portion between an inner extreme position in which projection 48 is engaged in groove 54, and an outermost position in which the projection is engaged in the groove 56. It will be noted that the adjustment of the trough member between the opposite extreme positions will correspondingly adjust the size of the material-receiving recess 37. The slide 14, as previously noted, moves conjointly with the trough member, and the registration of the index arm 46 with a selected indicium will mean that the defined recess 37 will hold the indicated quantity of material.

The invention has a number of highly desirable advantages, as for example, it permits one to dispense with the usual set of measuring spoons, each of different size, which set requires that a particular spoon first be located, and then used with the other spoons dangling therefrom or left loose within a drawer. In the present invention, one can adjust the size of the measuring spoon over a comparatively large range, while holding the spoon in one hand, the adjustments being made with the thumb of the hand grasping the spoon. This leaves the other hand free for any desired purpose, as for example for the purpose of stirring batter or other material while ingredients are being measured into the same by means of the spoon.

Still further, the invention is capable of being manufactured at a relatively low cost, from such inexpensive, readily moldable materials as plastic or the like. Of course, the spoon can be made of any suitable material, such as metal, plastic, wood, etc. and it is not desired that the protection be limited to the particular materials named.

It is to be further noted that the construction illustrated and described provides a highly compact spoon assembly that will take up no more space in a kitchen drawer or other storage place than is now taken up by a conventional spoon not having the advantages inherent in the invention. Still further, the spoon is separably assembled, to permit easy cleaning of the several parts. One need only spring the slide 14 out of engagement with the ribs or longitudinal tongues 32, and then spread the trough members slightly to disengage the ribs 34 thereof from the grooves 36 of the main portion. Then, when the device has been reassembled, the engagement of the slide over the body portion, in the manner previously described herein, seats the projection 48 in the recess, to hold the trough member and body portion against accidental separation when they are longitudinally shifted relative to one another.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A measuring spoon comprising an elongated body portion including at one end a main part and at the other part a handle part, the main part of the body portion being formed at opposite sides thereof with elongated guide grooves; a trough member of approximately semi-cylindrical cross section, formed open at one end and having an end wall at its other end, the trough member being slidably mounted upon and embracing the main part of the body portion, said trough member being formed with internal longitudinal ribs slidably engaging in said grooves of the body portion, whereby to mount the trough member for adjustment longitudinally of the body portion, said closed end of the trough member being spaced from the adjacent end of the body portion for defining a material-receiving recess therebetween adjustable in size according to selected longitudinal adjustment of the trough member upon the body portion; and a slide bridging the body portion and connected between opposite sides of the trough member, said slide including a handle to facilitate adjustment of the trough member upon the body portion, said slide being formed with a transversely extending slot and with an index arm extending in said slot and terminating short of one end of the slot to define a viewing opening beyond one end of the index arm, the body portion being formed with a longitudinal series of indicia selectively viewable through said viewing opening and registrable selectively with the index arm.

2. A measuring spoon comprising an elongated body portion including at one end a main part and at the other part a handle part, the main part of the body portion being formed at opposite sides thereof with elongated guide grooves; a trough member of approximately semi-cylindrical cross section, formed open at one end and having an end wall at its other end, the trough member being slidably mounted upon and embracing the main part of the body portion, said trough member being formed with longitudinal ribs slidably engaging in said grooves of the body portion, whereby to mount the trough member for adjustment longitudinally of the body portion, said closed end of the trough member being spaced from the adjacent end of the body portion for defining a material-receiving recess therebetween adjustable in size according to selected longitudinal adjustment of the trough member upon the body portion; and a slide bridging the body portion and connected between opposite sides of the trough member, said slide including a handle to facilitate longitudinal adjustment of the trough member upon the body portion, said slide being formed with a transversely extending slot and with an index arm extending in said slot and terminating short of one end of the slot to define a viewing opening beyond one end of the index arm, the body portion being formed with a longitudinal series of indicia selectively viewable through said opening and registrable selectively with the index arm, the body portion having a longitudinally extending, shallow recess the bottom wall of which is formed with a plurality of transversely extending grooves individually aligned transversely of the body portion with corresponding indicia, the index arm being formed with a depending detent adapted to snap into and out of the transverse grooves responsive to longitudinal adjustment of the trough member, to releasably hold the trough members in selected positions of adjustment.

3. A measuring spoon comprising an elongated body portion including at one end a main part and at the other end a handle part, the main part of the body portion being formed at opposite sides thereof with elongated guide grooves; a trough member of approximately semi-cylindrical cross section, formed open at one end and having an end wall at its other end, the trough member being slidably mounted upon and embracing the main part of the body portion, said trough member being formed with longitudinal ribs slidably engaging in said grooves of the body portion, whereby to mount the trough member for adjustment longitudinally of the body portion, said closed end of the trough member being spaced from the adjacent end of the body portion for defining a material-receiving recess therebetween adjustable in size according to selected longitudinal adjustment of the trough member upon the body portion; and a slide bridging the body portion and connected between opposite sides of the trough member, said slide including a handle to facilitate longitudinal adjustment of the trough member upon the body portion, said slide being formed with a tranversely extending slot and with an index arm extending in said slot and terminating short of one end of the slot to define a viewing opening beyond one end of the index arm, the body portion being formed with a longitudinal series of indicia selectively viewable through said opening and registrable selectively with the index arm, the body portion having a longitudinally extending, shallow recess the bottom wall of which is formed with a plurality of transversely extending grooves individually aligned transversely of the body portion with corresponding indicia, the index arm being formed with a depending detent adapted to snap into and out of the transverse grooves responsive to longitudinal adjustment of the trough member, to releasably hold the trough members in selected positions of adjustment, said index arm, when the detent is engaged in a selected one of the transverse grooves, being coplanar with the body-portion-overlying part of the slide, said detent, when not engaged in a selected transverse groove, bearing against an ungrooved portion of the bottom surface of said recess to bias the index arm upwardly out of the plane of the body-portion-overlying part of the slide.

4. A measuring spoon comprising an elongated body portion including at one end a main part and at the other part a handle part, the main part of the body portion being formed at opposite sides thereof with elongated guide grooves; a trough member of approximately semi-cylindrical cross section, formed open at one end and having an end wall at its other end, the trough member being slidably mounted upon and embracing the main part of the body portion, said trough member being formed with longitudinal ribs slidably engaging in said grooves of the body portion, whereby to mount the trough member for adjustment longitudinally of the body portion, said closed end of the trough member being spaced from the adjacent end of the body portion for defining a material-receiving recess therebetween adjustable in size according to selected longitudinal adjustment of the trough member upon the body portion; and a slide bridging the body portion and connected between opposites sides of the trough member, said slide including a handle to facilitate longitudinal adjustment of the trough member upon the body portion, said slide being formed with a transversely extending slot and with an index arm extending in said slot and terminating short of one end of the slot to define a viewing opening beyond one end of the index arm, the body portion being formed with a longitudinal series of indicia selectively viewable through said opening and registrable selectively with the index arm, the body portion having a longitudinally extending, shallow recess the bottom wall of which is formed with a plurality of transversely extending grooves individually aligned transversely of the body portion with corresponding indicia, the index arm being formed with a depending detent adapted to snap into and out of the transverse grooves responsive to longitudinal adjustment of the trough member, to releasably hold the trough members in selected positions of adjustment, said detent extending transversely of the recess over substantially the full width thereof, the end walls of the recess being disposed in the path of movement of the detent longitudinally of the recess to provide limit stops engaging the slide, at opposite extreme positions to which the slide and trough member are shifted longitudinally of the body portion.

5. A measuring spoon comprising an elongated body portion; a trough member slidably mounted upon said body portion and projecting at one end beyond the body portion, said one end of the trough member and the adjacent end of the body portion defining therebetween a recess to receive a quantity of material to be measured; and a slide bridging the body portion and connected to the trough member to facilitate shifting of the trough member longitudinally of the body portion, the slide being formed with depending side flanges having internal, confronting, longitudinal grooves closed at their opposite ends, said trough member at opposite sides thereof including external longitudinal ribs of a length corresponding approximately to the length of the respective grooves, said ribs engaging in the grooves to provide said connection of the slide to the trough member, the flanges of the slide being spring-tensioned in a direction toward each other releasably to retain the ribs in the grooves, with the slide and trough member in embracing relation to the body portion.

References Cited in the file of this patent

UNITED STATES PATENTS

| 808,967 | Arrowsmith | Jan. 2, 1906 |
| 2,555,956 | Chester | June 5, 1951 |
| 2,747,410 | Dubin | May 29, 1956 |